US012674573B1

(12) United States Patent
Wang

(10) Patent No.: US 12,674,573 B1
(45) Date of Patent: Jul. 7, 2026

(54) LIGHT EMITTING DIODE (LED) LIGHT STRING WITH IMPROVED SEALED WATERPROOF STRUCTURE

(71) Applicant: Dongguan Huanhui Technology Co., Ltd., Dongguan City (CN)

(72) Inventor: Wei Wang, Dongguan City (CN)

(73) Assignee: Dongguan Huanhui Technology Co., Ltd., Dongguan City (CN)

( * ) Notice: Subject to any disclaimer, the term of this patent is extended or adjusted under 35 U.S.C. 154(b) by 0 days.

(21) Appl. No.: 19/547,084

(22) Filed: Feb. 23, 2026

(30) Foreign Application Priority Data

Feb. 3, 2026 (CN) ......................... 202620159221.1

(51) Int. Cl.

| | |
|---|---|
| ***F21V 31/00*** | (2006.01) |
| ***F21K 9/235*** | (2016.01) |
| ***F21K 9/66*** | (2016.01) |
| ***F21S 4/10*** | (2016.01) |
| ***F21V 19/00*** | (2006.01) |
| ***F21V 23/00*** | (2015.01) |
| ***F21V 23/06*** | (2006.01) |
| *F21Y 115/10* | (2016.01) |

(52) U.S. Cl.
CPC ............ *F21V 31/005* (2013.01); *F21K 9/235* (2016.08); *F21K 9/66* (2016.08); *F21S 4/10* (2016.01); *F21V 19/0025* (2013.01); *F21V 23/002* (2013.01); *F21V 23/06* (2013.01); *F21Y 2115/10* (2016.08)

(58) Field of Classification Search
CPC ................................ F21V 31/005; F21S 4/10
USPC .................................................... 362/249.14
See application file for complete search history.

(56) References Cited

U.S. PATENT DOCUMENTS

| | | | | |
|---|---|---|---|---|
| 12,359,801 | B1 * | 7/2025 | Ruan | F21V 23/06 |
| 2002/0106931 | A1 * | 8/2002 | Hsien-Te | F21V 31/00 439/490 |
| 2023/0392776 | A1 * | 12/2023 | Zou | H01R 33/09 |
| 2024/0167647 | A1 * | 5/2024 | Yang | F21S 4/00 |
| 2024/0384842 | A1 * | 11/2024 | Zou | F21V 3/02 |
| 2025/0035288 | A1 * | 1/2025 | Wu | F21V 19/0025 |
| 2026/0036293 | A1 * | 2/2026 | Loomis | F21S 4/10 |
| 2026/0055881 | A1 * | 2/2026 | Tan | F21V 23/002 |
| 2026/0110407 | A1 * | 4/2026 | Deng | F21K 9/90 |

* cited by examiner

*Primary Examiner* — Christopher M Raabe
(74) *Attorney, Agent, or Firm* — AVEK IP, LLC

(57) ABSTRACT

Some embodiments of the disclosure provide a light emitting diode (LED) light string with an improved sealed waterproof structure. In some examples, a series-connecting wire is connected to a plurality of sealed waterproof lamp holders. In other examples, after a bulb shell is mounted, the interior of a lamp holder body is completely sealed, with a good waterproof effect. In further examples, there is a safety zone greater than 3 mm between a first contact zone and a second contact zone of the lamp holder electrically connected to the series-connecting wire, which may prevent short circuits caused by electric leakage of the series-connecting wire, with high safety.

10 Claims, 8 Drawing Sheets

LIGHT EMITTING DIODE (LED) LIGHT STRING WITH IMPROVED SEALED WATERPROOF STRUCTURE

CROSS REFERENCE TO RELATED APPLICATION

This application claims priority to Chinese patent application number 2026201592211, filed on Feb. 3, 2026, the disclosure of which is incorporated by reference herein in its entirety.

FIELD OF THE DISCLOSURE

The disclosure relates to the technical field of luminaries, and particularly relates to a light emitting diode (LED) light string with an improved sealed waterproof structure.

BACKGROUND

A light string is a lighting luminaire with a plurality of light emitting nodes. The light string is more inclined to create diverse atmospheres by means of the luminaires. For example, luminaires with different light emitting colors are made into a light string, which is then fixed in places such as artificial trees, wall sides, fences and ceiling tops. However, the waterproof effect of the lamp holder of the existing light string is poor, such as the luminaire disclosed in Chinese Patent No. CN214249322U. This lamp holder is poor in sealing performance. during outdoor use, water vapor easily enters the interior of the lamp holder to affect the use effect. Moreover, two terminals for puncturing a wire are close, such that the wire of the entire light string is easily short-circuited in case of electric leakage, which damages the service life of the light string and has potential safety hazards.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the LED light string with an improved sealed waterproof structure provided by the disclosure includes a series-connecting wire, one end of the series-connecting wire being connected to a plug and the other end thereof being connected to a socket, where:

- the series-connecting wire is connected to a plurality of sealed waterproof lamp holders, and the lamp holders are detachably connected to bulb shells;
- the plurality of lamp holders are spaced apart and located between the plug and the socket;
- each of the lamp holders is provided with a lamp holder body, where one end of the lamp holder body is provided with a linear groove, the linear groove is provided with a first contact zone and a second contact zone, a safety zone is disposed between the first contact zone and the second contact zone, the first contact zone is close to a wire inlet end of the linear groove, and the second contact zone is close to a wire outlet end of the linear groove;
- the other end of the lamp holder body is provided with an accommodating cavity, a mounting base is disposed in the accommodating cavity, the accommodating cavity further includes a first connecting piece and a second connecting piece that are thermally formed on the lamp holder body, a puncturing portion of the first connecting piece passes through the first contact zone, a puncturing portion of the second connecting piece passes through the second contact zone, an LED light source is plugged into the mounting base, and the LED light source is electrically connected to the first connecting piece and the second connecting piece;
- each of the lamp holders is further provided with an end cap, the end cap is provided with a wire pressing block that is capable of being pressed into the linear groove, one end of the lamp holder body is provided with a blind hole, the end cap is provided with a plug-in strip, and the plug-in strip is coated with glue and is inserted into the blind hole, such that the end cap is fixedly connected to the lamp holder body; and
- a sealing member is further disposed between each of the lamp holders and each of the bulb shells, and each of the bulb shells is threadedly connected to each of the lamp holders to apply pressure to the sealing member to form sealing.

In some embodiments, the first connecting piece and the second connecting piece are both metal conductive components, and the puncturing portions of the first connecting piece and the second connecting piece are capable of puncturing an insulating rubber sheet of the series-connecting wire and electrically contact a conductive wire core inside the series-connecting wire.

Optionally, a distance between a top end of the puncturing portion and a bottom of the linear groove is greater than 2 mm.

In some embodiments, the mounting base is provided with a plug-in port, the first connecting piece and the second connecting piece are each provided with a U-shaped snap-fit portion located in the plug-in port, and the LED light source is positioned via the plug-in port and is snap-fitted to the U-shaped snap-fit portion.

Optionally, the mounting base is provided with a plug-in port, the LED light source is provided with an electrical connecting plate, an end of the electrical connecting plate is capable of being inserted into the plug-in port, and the other end of the electrical connecting plate is provided with an LED light bar.

In some embodiments, the mounting base is provided with a plug-in port, a positioning groove is formed in the plug-in port, the LED light source is provided with an electrical connecting plate capable of being inserted into the plug-in port, and a protruding electronic component capable of being positioned and plugged into the positioning groove is disposed on the electrical connecting plate.

Optionally, the first connecting piece and the second connecting piece are each provided with a U-shaped snap-fit portion embedded into the mounting base, a bending portion is disposed between the U-shaped snap-fit portion and the puncturing portion, and the bending portion enables the first connecting piece and the second connecting piece to be Z-shaped.

In other embodiments, a lower portion of the puncturing portion is provided with a handle portion a connected to the bending portion, and the U-shaped snap-fit portion is provided with a handle portion b connected to the bending portion.

Optionally, a portion of each of the lamp holders located in the accommodating cavity is provided with a waterproof groove, and the sealing member is snap-fitted and fixed to the waterproof groove.

In other embodiments, each of the bulb shells is provided with a neck, a first connecting portion is disposed on an inner wall of the accommodating cavity, a second connecting portion is disposed at a front end of the neck, and the first connecting portion threadedly matches the second connecting portion.

Optionally, each of the bulb shells is provided with a neck connected to each of the lamp holders, the neck is provided with a snap ring, and the sealing member is disposed on the snap ring.

In other embodiments, the blind hole and the plug-in strip are both cylindrical, a support member is disposed near a front end of the plug-in strip, and the support member abuts against an inner wall of the blind hole elastically.

Optionally, the plug-in strip is provided with a plurality of recesses.

BRIEF DESCRIPTION OF THE DRAWINGS

Illustrative embodiments of the disclosure are described in detail below with reference to the attached drawing figures.

REFERENCE NUMERALS

Figure 1:
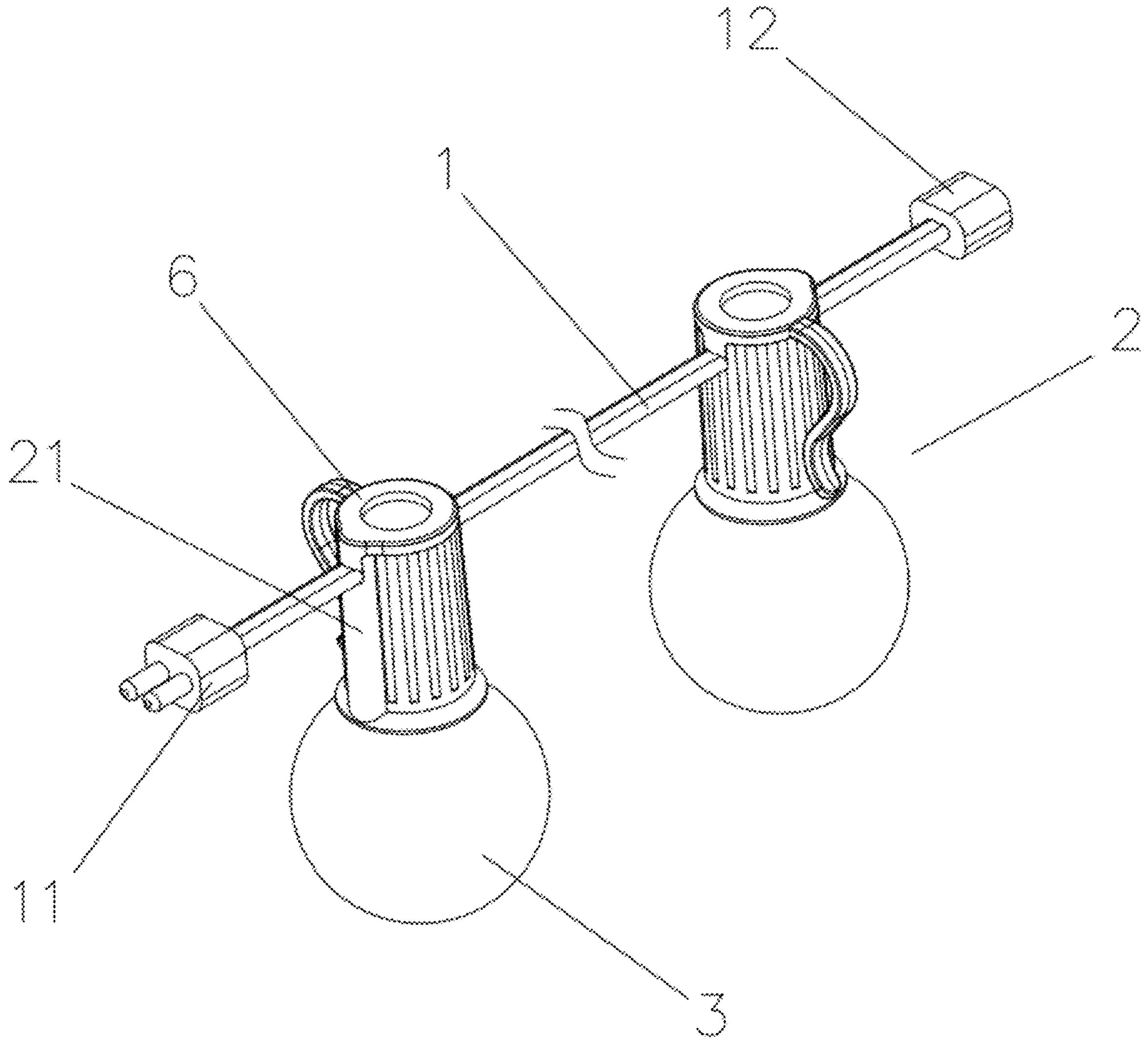
FIG. 1 shows a partial structure schematic diagram of a light string according to an embodiment of the disclosure.

1, series-connecting wire; 11, plug; 12, socket; 2, lamp holder; 21, lamp holder body; 22, linear groove; 23, first contact zone; 24, second contact zone; 25, safety zone; 26, blind hole; 3, bulb shell; 31, sealing member; 32, neck; 33, second connecting portion; 34, snap ring; 4, accommodating cavity; 41, mounting base; 42, first connecting piece; 43, second connecting piece; 44, puncturing portion; 45, plug-in port; 451, positioning groove; 46, U-shaped snap-fit portion; 47, bending portion; 48, waterproof groove; 49, first connecting portion; 5, LED light source; 51, electrical connecting plate; 52, LED light bar; 53, first electric connecting layer; 54, second electric connecting layer; 55, protruding electronic component; 6, end cap; 61, wire pressing block; 62, plug-in strip; 63, support member; and 64, recess.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The disclosure will be described in detail below in conjunction with drawings 1-8.

The LED light string with an improved sealed waterproof structure provided by the disclosure may include a series-connecting wire 1, one end of the series-connecting wire 1 being connected to a plug 11 and the other end thereof being connected to a socket 12. After the plug 11 is plugged into a power source device, the series-connecting wire 1 is electrified. A plurality of series-connecting wires 1 may be connected in series by plugging the plug 11 into the socket 12 on another series-connecting wire 1 to combine an LED light strip with any length.

The series-connecting wire 1 is connected to a plurality of sealed waterproof lamp holders 2, and the lamp holders 2 are detachably connected to bulb shells 3. The assemblies such as the lamp holder 2 and the bulb shell 3 are combined to form a light emitting mode, and the series-connecting wire 1 is connected to a plurality of light emitting nodes to form a light string structure.

The plurality of lamp holders 2 are spaced apart and located between the plug 11 and the socket 12. The electrical connection mode between the lamp holder 2 and the series-connecting wire 1 is optionally parallel circuit connection. When a single lamp holder 2 is damaged or paralyzed, circuit connections of other lamp holders 2 of the LED light string are not affected.

Figure 3:
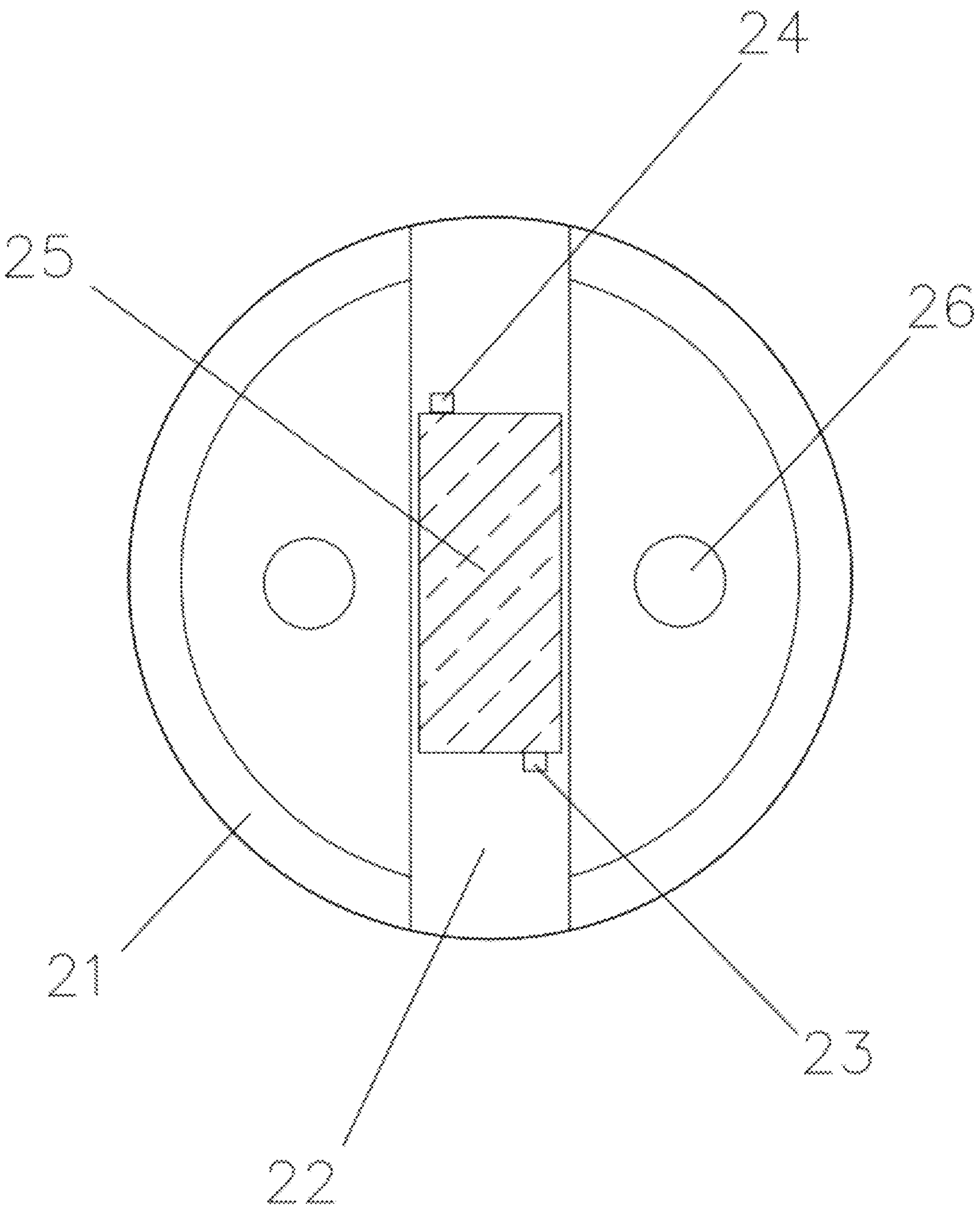
FIG. 3 shows a schematic structural diagram of an end of a lamp holder body provided with a linear groove according to an embodiment of the disclosure.
Figure 4:
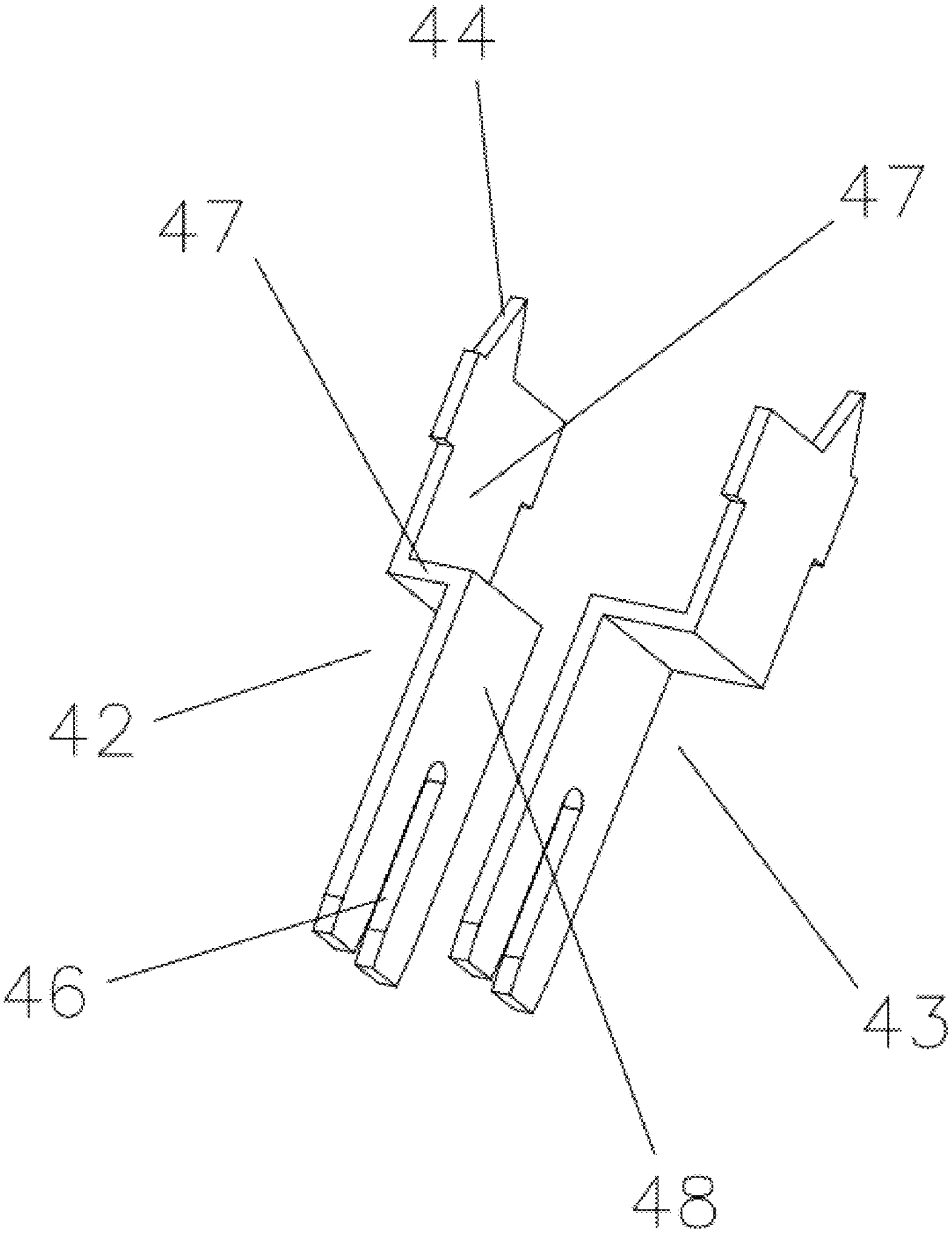
FIG. 4 show a schematic diagram of a first connecting piece and a second connecting piece according to an embodiment of the disclosure.
Figure 5:
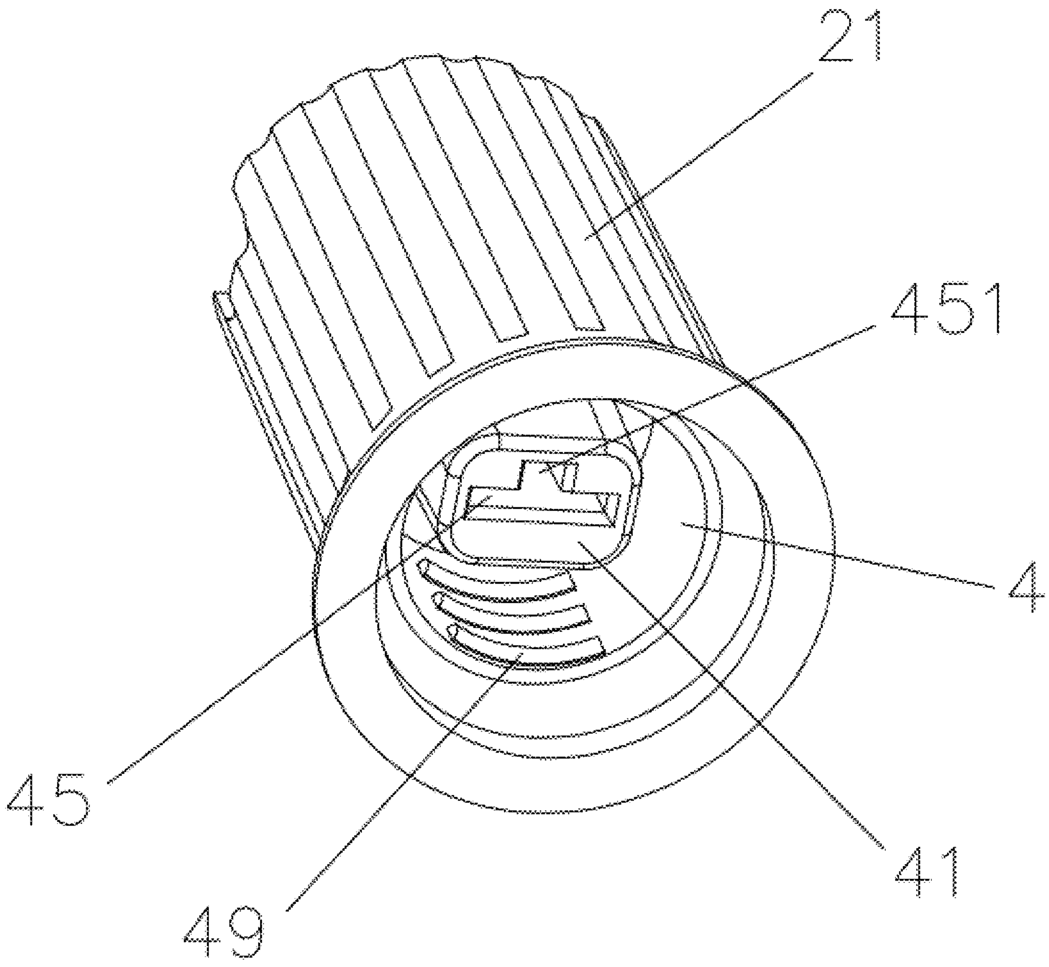
FIG. 5 show a schematic structural diagram of an end of a lamp holder body provided with an accommodating cavity according to an embodiment of the disclosure.

Each of the lamp holders 2 is provided with a lamp holder body 21. One end of the lamp holder body 21 is provided with a linear groove 22. As shown in FIG. 3, the linear groove 22 is provided with a first contact zone 23 and a second contact zone 24, a safety zone 25 is disposed between the first contact zone 23 and the second contact zone 24, the first contact zone 23 is close to a wire inlet end of the linear groove 22, and the second contact zone 24 is close to a wire outlet end of the linear groove 22. When each of the lamp holders 2 is connected to the series-connecting wire 1, the series-connecting wire 1 is placed in the linear groove 22. The series-connecting wire 1 is composed of two independent electric wires. The two electric wires of the series-connecting wire 1 are electrically connected to the first contact zone 23 and the second contact zone 24, respectively. The safety zone 25 is formed between the first contact zone 23 and the second contact zone 24. The length of the safety zone 25 is a spacing between a conductive component in the first contact zone 23 and a conductive component in the second contact zone 24, and this spacing is usually not less than 3 mm. When an accidental electric leakage occurs at a part of the series-connecting wire 1 is located in the first contact zone 23 or the second contact zone 24, the safety zone 25 may play a role of isolating the current to prevent the series-connecting wire 1 from being short-circuited, such that the safety is high.

The other end of the lamp holder body 21 is provided with an accommodating cavity 4, a mounting base 41 is disposed in the accommodating cavity 4, the accommodating cavity may further include a first connecting piece 42 and a second connecting piece 43 that are thermally formed on the lamp holder body 21, a puncturing portion 44 of the first connecting piece 42 passes through the first contact zone 23, a puncturing portion 44 of the second connecting piece 43 passes through the second contact zone 24, an LED light source 5 is plugged into the mounting base 41, and the LED light source 5 is electrically connected to the first connecting piece 42 and the second connecting piece 43. During production, the lamp holder body 21 is usually injection-molded by a corresponding mold. During the injection molding process of the lamp holder body 21, the first connecting piece 42 and the second connecting piece 43 are placed in the mold. After the injection molding of the lamp holder body 21, the first connecting piece 42 and the second connecting piece 43 will be tightly bonded to the lamp holder body 21, which may eliminate the gaps between the first connecting piece 42 and the second connecting piece 43, and the lamp holder 21, such that the linear groove 22 and the accommodating cavity 4 are fully isolated. The first connecting piece 42 and the second connecting piece 43 are electrically connected to the series-connecting wire 1 to form two electrodes, and the LED light source 5 is electrically connected to the first connecting piece 42 and the second connecting piece 43 to be electrified to emit light.

The first connecting piece 42 and the second connecting piece 43 are both metal conductive components, and the puncturing portions 44 of the first connecting piece 42 and the second connecting piece 43 are capable of puncturing an insulating rubber sheet of the series-connecting wire 1 and electrically contact a conductive wire core inside the series-connecting wire 1. The series-connecting wire 1 is placed in the linear groove 22, the puncturing portions 44 extending from the first connecting piece 42 and the second connecting piece 43 puncture the insulating rubber sheet outside the series-connecting wire 1 from the first contact zone 23 and the second contact zone 24, respectively, the puncturing portions 44 electrically contact the series-connecting wire 1 to make the corresponding first connecting piece 42 and second connecting piece 43 electrified, and the electrical connection mode between the lamp holder 2 and the series-connecting wire 1 is simple, which facilitates assembly.

A distance between a top end of the puncturing portion 44 and a bottom of the linear groove 22 is greater than 2 mm. The rubber sheet of the series-connecting wire 1 has a certain thickness, and the top end of the puncturing portion 44 is sharp, the contact area of the top end of the puncturing portion 44 is small, and the puncturing portion 44 needs to puncture into the series-connecting wire 1 by a certain depth. In this solution, the protruding length of the puncturing portion 44 is greater than 2 mm, usually 2-4 mm. the top end of the puncturing portion 44 punctures the insulating rubber sheet below the series-connecting wire 1 and electrically contacts a metal wire assembly in the middle to ensure the first connecting piece 42 and the second connecting piece 43 may be electrically connected to the series-connecting wire 1 stably.

Figure 6:
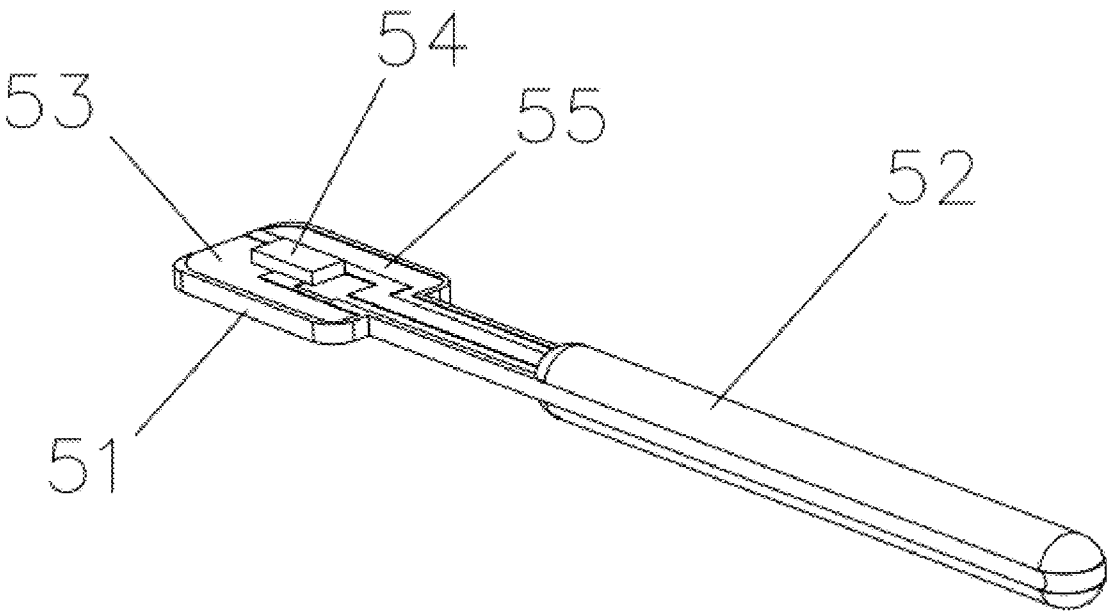
FIG. 6 shows a schematic structural diagram of an LED light source according to an embodiment of the disclosure.
Figure 7:
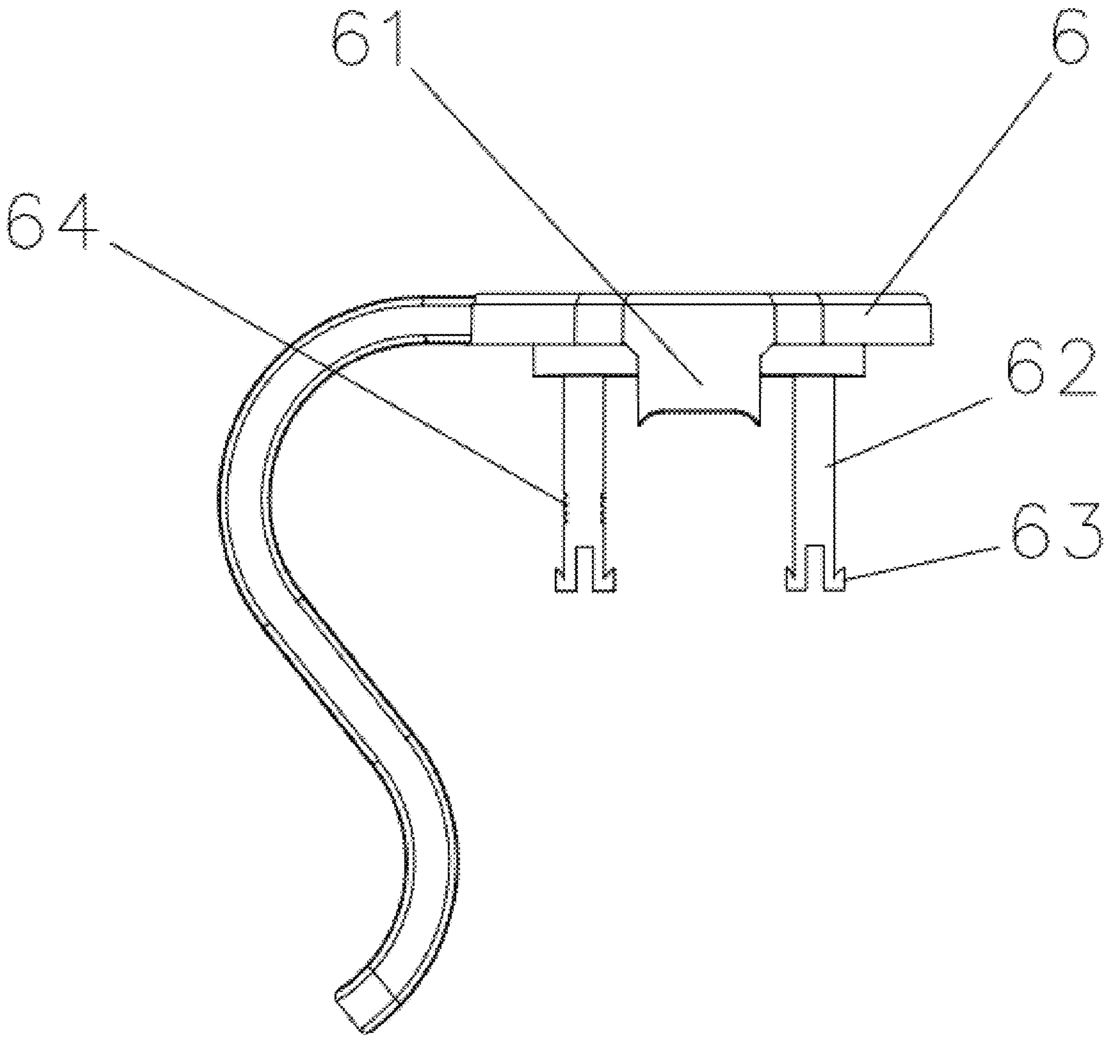
FIG. 7 shows a schematic structural diagram of an end cap according to an embodiment of the disclosure.

The mounting base 41 is provided with a plug-in port 45, the first connecting piece 42 and the second connecting piece 43 are each provided with a U-shaped snap-fit portion 46 located in the plug-in port 45, and the LED light source 5 is positioned via the plug-in port 45 and is snap-fitted to the U-shaped snap-fit portion 46. Referring to FIG. 6, the LED light source 5 is an independent component, the LED light source 5 and the bulb shell 3 may be connected to the lamp holder 2 respectively. In actual use, the bulb shell 3 or the LED light source 5 may be replaced independently, such that the use cost is low. At least part of the U-shaped snap-fit portion 46 protrudes toward the plug-in port 45, and the assembly of the LED light source 5 is electrically connected to the U-shaped snap-fit portion 46 after being plugged into the plug-in port 45, such that the LED light source 5 is electrified to emit light.

The mounting base 41 is provided with a plug-in port 45, the LED light source 5 is provided with an electrical connecting plate 51, an end of the electrical connecting plate 51 is capable of being inserted into the plug-in port 45, and the other end of the electrical connecting plate 51 is provided with an LED light bar 52. The electrical connecting plate 51 is provided with a first electric connecting layer 53 and a second electric connecting layer 54, and the first electric connecting layer 53 and the second electric connecting layer 54 both extend into the LED light bar 52. During assembly, the electrical connecting plate 51 is plugged into the plug-in port 45 to complete mounting of the LED light source 5, and the mounting mode is simple and convenient. The electrical connecting plate 51 is electrically connected to the first connecting piece 42 and the second connecting piece 43 in the plug-in port 45 after being plugged into the plug-in port 45. More specifically, after the electrical connecting plate 51 is plugged into the plug-in port 45, the first electric connecting layer 53 electrically contacts the U-shaped snap-fit portion 46 of the first connecting piece 42, and the second electric connecting layer 54 electrically contacts the U-shaped snap-fit portion 46 of the second connecting piece 43, such that the assembly of the LED light source 5 is connected to two electrodes to make the LED light bar 52 emit light.

The mounting base 41 is provided with a plug-in port 45, a positioning groove 451 is formed in the plug-in port 45) the LED light source 5 is provided with an electrical connecting plate 51 capable of being inserted into the plug-in port 45, and a protruding electronic component 55 capable of being positioned and plugged into the positioning groove 451 is disposed on the electrical connecting plate 51. In consideration of reducing the manufacturing cost of the LED light source 5, the LED light source 5 provided by the disclosure usually uses a circuit structure with a fixed electrode for electrification. Therefore, it is needed to connect the LED light source 5 to the first connecting piece 42 and the second connecting piece 43 in a correct direction. The protruding electronic component 55 is composed of protruding power resistors disposed on the surface of the electrical connecting plate 51. The size of the plug-in port 45 matches the electrical connecting plate 51. The plug-in port 45 is only used for the electrical connecting plate 51 to insert. Only one positioning groove 451 is formed to insert the protruding electronic component 55, such that the LED light source 5 cannot be inserted into the plug-in port 45 when overturning to the reverse direction. The LED light source 5 may only be inserted into the plug-in port 45 at a designated angle to ensure the assembly of the LED light source 5 is stably connected to the circuit.

The first connecting piece 42 and the second connecting piece 43 are each provided with a U-shaped snap-fit portion 46 embedded into the mounting base 41, a bending portion 47 is disposed between the U-shaped snap-fit portion 46 and the puncturing portion 44, and the bending portion 47 enables the first connecting piece 42 and the second connecting piece 43 to be Z-shaped. In consideration of cost, the volume of the electrical connecting plate 51 of the LED light source 5 is very small, the electrical connecting plate is provided with the first electric connecting layer 53 and the second electric connecting layer 54, and the spacing between the first electric connecting layer 53 and the second electric connecting layer 54 is very small, which is usually less than the length of the safety zone 25. Therefore, the spacing between the two puncturing portions 44 is larger than the spacing between the two U-shaped snap-fit portions. In this solution, by disposing the bending portion 47, the first connecting piece 42 and the second connecting piece 43 are Z-shaped, rather than the conventional strip-like or strip-shaped electric connecting piece. Further, because the first connecting piece 42 and the second connecting piece 43 are thermally formed with the lamp holder body 21, even if the first connecting piece 42 and the second connecting piece 43 are Z-shaped, they may also be disposed in the lamp holder body 21.

The lower portion of the puncturing portion 44 is provided with a handle portion a48 connected to the bending portion 47, and the U-shaped snap-fit portion 46 is provided with a handle portion b49 connected to the bending portion 47. To better form the dislocation, the bending portion 47 and the handle portions 48*a* and 49*b* are integrally formed and have an included angle of 80-110°. In combination with production and processing convenience, use of the included angle of 90° is optimal.

Each of the lamp holders 2 is further provided with an end cap 6, the end cap 6 is provided with a wire pressing block 61 that is capable of being pressed into the linear groove 22, one end of the lamp holder body 21 is provided with a blind hole 26, the end cap 6 is provided with a plug-in strip 62, and the plug-in strip 62 is coated with glue and is inserted into the blind hole 26, such that the end cap 6 is fixedly connected to the lamp holder body 21. When each of the lamp holders 2 is assembled to the series-connecting wire 1, the series-connecting wire 1 is first placed in the linear groove 22, then the end cap 6 is assembled to the lamp holder body 21, and the wire pressing block 61 is pressed into the linear groove 22 to press the series-connecting wire 1 to the bottom of the linear groove 22, such that the puncturing portion 44 punctures the series-connecting wire 1. After the end cap 6 is assembled, the wire pressing block 61 may tightly press the series-connecting wire 1 into the linear groove 22 to prevent exposure of the wire core due to sliding of the series-connecting wire 1. The conventional end cap 6 is connected and fixed to the lamp holder body 21 via a buckling structure. This fixing mode is not a complete fixation, and there remains a risk of loosening of the end cap 6. In this solution, by coating the surface of the plug-in strip 62 with glue or injecting glue into the blind hole 26, and then inserting the plug-in strip 62 into the blind hole 26 to press the end cap 6 to cure of the glue, the end cap 6 may be fixed on the lamp holder body 21, such that the connecting structure is stable.

The blind hole 26 and the plug-in strip 62 are both cylindrical, a support member 63 is disposed near a front end of the plug-in strip 62, and the support member 63 abuts against an inner wall of the blind hole 26 elastically. After the plug-in strip 62 is inserted into the blind hole 26, the support member 63 may provide a compact contact zone, and the assembly gap between the plug-in strip 62 and the blind hole 26 is eliminated by means of an elastic pressure, thereby avoiding deflection caused by loosening before glue curing.

The plug-in strip 62 is provided with a plurality of recesses 64. In this solution, the plug-in strip 62 may tightly match the blind hole 26. The exterior of the plug-in strip 62 tightly abuts against the inner wall of the blind hole 26. Glue is adhered in advance in the recesses 64, and then the plug-in strip 62 is inserted into the blind hole 26. The plug-in strip 62 may be tightly connected to the blind hole 26. The glue in the recesses 64 may also be fixed, such that the end cap 6 is connected to the lamp holder body 21 more stably.

A sealing member 31 is further disposed between each of the lamp holders 2 and each of the bulb shells 3, and each of the bulb shells 3 is threadedly connected to each of the lamp holders 2 to apply pressure to the sealing member 31 to form sealing. The bulb shell 3 may be detached and replaced independently to reduce the use cost of the LED light string. Bulb shells 3 with different shapes and colors may also be replaced to improve the aesthetics of the LED light string. After the bulb shell 3 is mounted, the surface of the bulb shell 3 matches the lamp holder body 21 to apply pressure to the sealing member 31, such that the sealing member 31 tightly blocks the gap between the bulb shell 3 and the open end of the accommodating cavity 4 to prevent water vapor from entering the accommodating cavity 4 and the bulb shell 3, with a good waterproof effect.

Figure 8:
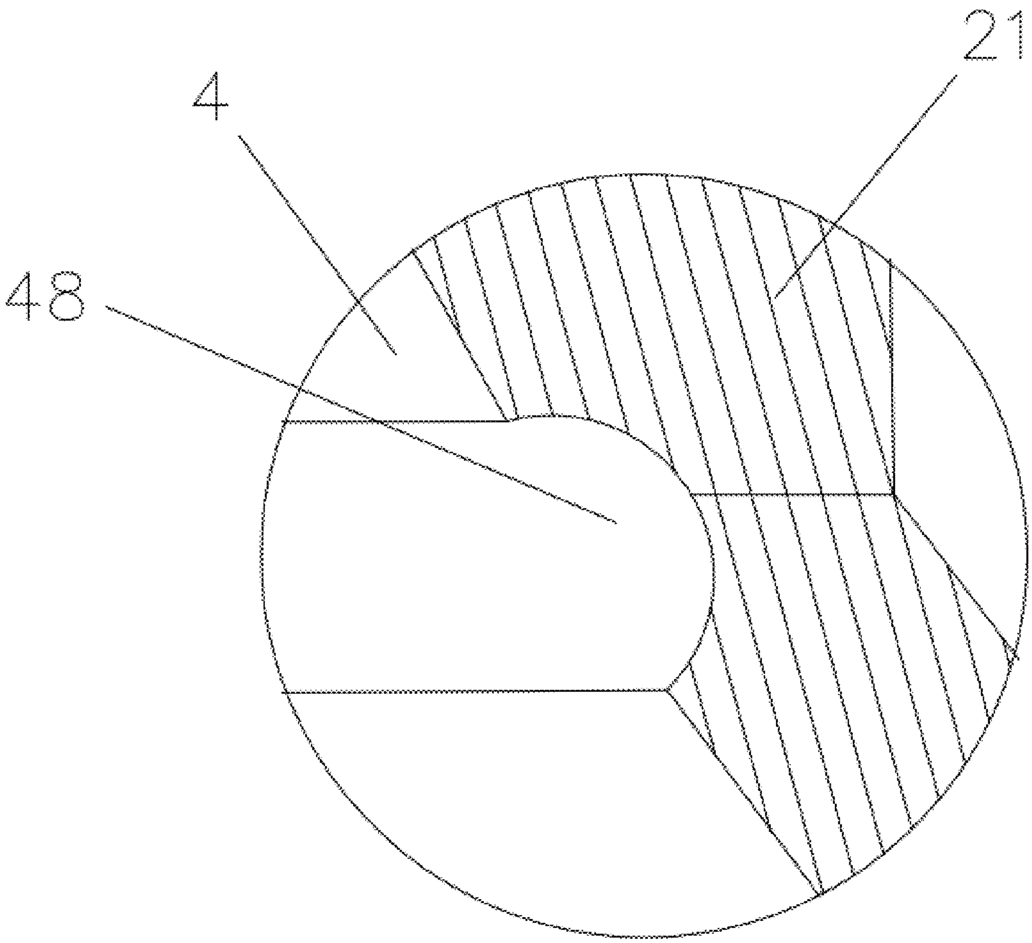
FIG. 8 shows a schematic structural diagram of a waterproof groove according to an embodiment of the disclosure.

As an assembly for assembling the sealing member 31, referring to FIG. 8, a portion of each of the lamp holders 2 located in the accommodating cavity 4 is provided with a waterproof groove 48, and the sealing member 31 is snap-fitted and fixed to the waterproof groove 48. In this embodiment, the sealing member 31 mates with the lamp holder body 21. The sealing member 31 is first assembled in the waterproof groove 48. When the bulb shell 3 is replaced, the sealing member 31 needs not to be replaced, and the sealing member 31 is also prevented from missing.

Each of the bulb shells 3 is provided with a neck 32, a first connecting portion 49 is disposed on an inner wall of the accommodating cavity 4, a second connecting portion 33 is disposed at a front end of the neck 32, and the first connecting portion 49 threadedly matches the second connecting portion 33. Optionally, the first connecting portion 49 and the second connecting portion 33 are both provided with threads. The bulb shell 3 is mounted or detached by means of screwing. The bulb shell 3 is assembled more stably. As an alternative, the first connecting portion 49 may be made of an elastic material. A snap-fit ring structure engageable with the first connecting portion 49 is disposed on the exterior of the second connecting portion 33. The bulb shell 3 is connected to each of the lamp holders 2 by inserting the neck 32 into the accommodating cavity 4, such that the mounting and detaching mode is more convenient.

Figure 2:
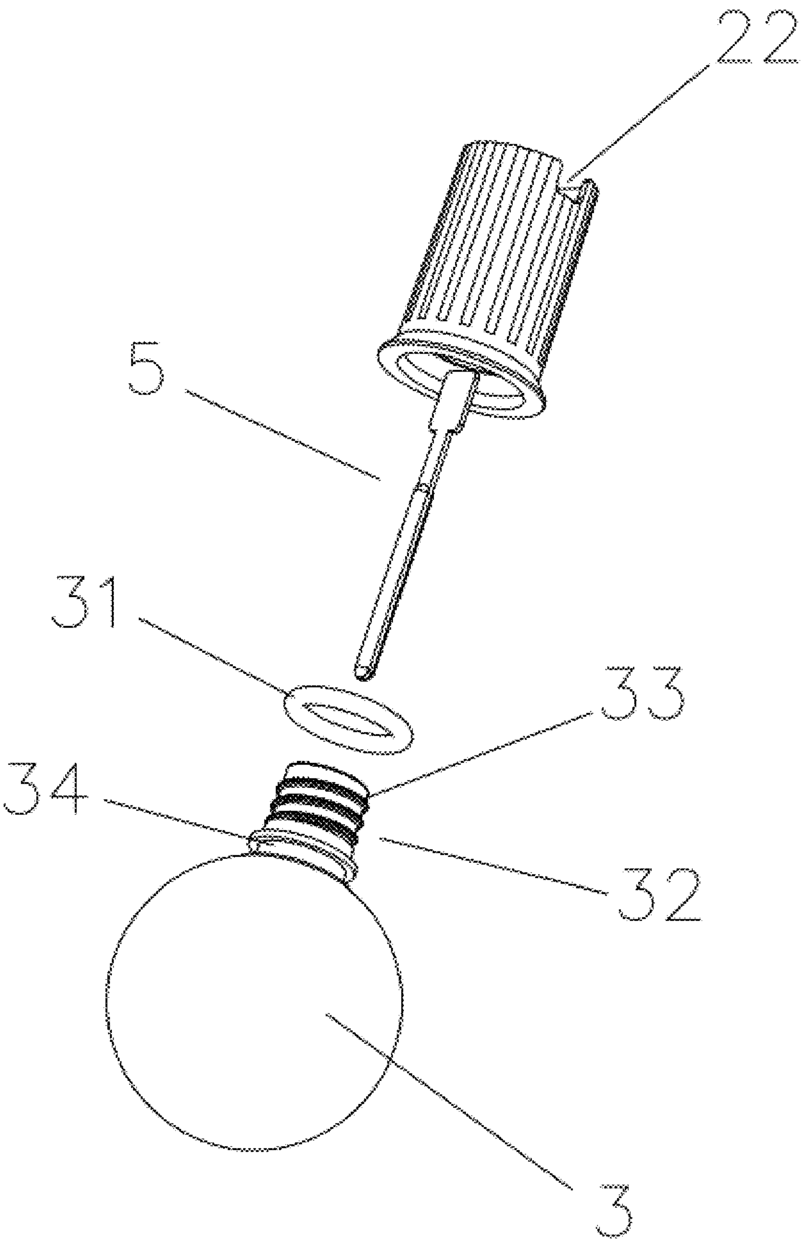
FIG. 2 shows a partial structure exploded schematic diagram of a light string according to an embodiment of the disclosure.

As another embodiment for assembling the sealing member 31, referring to FIG. 2, each of the bulb shells 3 is provided with a neck 32 connected to each of the lamp holders 2, the neck 32 is provided with a snap ring 34, and the sealing member 31 is disposed on the snap ring 34. In view of the different pressing forces exerted on the sealing member 31 by bulb shells 3 of different sizes, there is a risk of water leakage if the size of the bulb shell 3 is mismatched with that of the sealing member 31. In this embodiment, the sealing member 31 mates with the bulb shell 3, and the open end of the accommodating cavity 4 is horn-shaped. When the bulb shells 3 with different sizes are replaced, the sealing members 31 with corresponding sizes mate with the bulb shells 3 with corresponding sizes. The bulb shell 3 is assembled, such that the bulb shell 3 mates with the open end of the accommodating cavity 4 to apply pressure to the sealing member 31 to achieve the optimal sealing and waterproof effect.

The above content is merely preferred embodiments of the disclosure. For those of ordinary skill in the art, based on the concept of the disclosure, there may be changes in the specific implementation manner and application scopes. The content of this specification shall not be construed as a limitation on the disclosure.

Various embodiments of the disclosure may have one or more of the following effects. In some embodiments, the disclosure may include the series-connecting wire, where the series-connecting wire is connected to the plurality of sealed waterproof lamp holders, the lamp holders are detachably connected to bulb shells, the sealing member is disposed between each of the lamp holders and each of the bulb shells; each of the lamp holders is further provided with the lamp holder body and the end cap, where one end of the lamp holder body is provided with the linear groove, the linear groove is provided with the first contact zone and the second contact zone, the safety zone is disposed between the first contact zone and the second contact zone. In other embodiments, the end of the lamp holder body provided with the linear groove is isolated from the interior of the lamp holder body, and after a bulb shell is mounted, the interior of the lamp holder body is completely sealed, with a good waterproof effect; there is a safety zone greater than 3 mm between a first contact zone and a second contact zone of the lamp holder electrically connected to the series-connecting wire, which may prevent short circuits caused by electric leakage of the series-connecting wire, with high safety; and the bulb shells or LED light source may be replaced independently, such that the use cost is low. In further embodiments, the disclosure may provide a light emitting diode (LED) light string with an improved sealed waterproof structure, which may have the advantages of being sealed, waterproof, and high in safety.

Many different arrangements of the various components depicted, as well as components not shown, are possible without departing from the spirit and scope of the disclosure. Embodiments of the disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A light emitting diode (LED) light string, comprising a series-connecting wire (1), one end of the series-connecting wire (1) being connected to a plug (11) and another end thereof being connected to a socket (12), wherein:

the series-connecting wire (1) is connected to a plurality of sealed waterproof lamp holders (2), and the lamp holders (2) are detachably connected to bulb shells (3);

the plurality of lamp holders (2) are spaced apart and located between the plug (11) and the socket (12);

each of the lamp holders (2) is provided with a lamp holder body (21), wherein:

one end of the lamp holder body (21) is provided with a linear groove (22), the linear groove (22) is provided with a first contact zone (23) and a second contact zone (24), a safety zone (25) is disposed between the first contact zone (23) and the second contact zone (24), the first contact zone (23) is close to a wire inlet end of the linear groove (22), and the second contact zone (24) is close to a wire outlet end of the linear groove (22);

another end of the lamp holder body (21) is provided with an accommodating cavity (4), a mounting base (41) is disposed in the accommodating cavity (4), the accommodating cavity further comprises a first connecting piece (42), and a second connecting piece (43) that are thermally formed on the lamp holder body (21), a puncturing portion (44) of the first connecting piece (42) passes through the first contact zone (23), a puncturing portion (44) of the second connecting piece (43) passes through the second contact zone (24), an LED light source (5) is plugged into the mounting base (41), and the LED light source (5) is electrically connected to the first connecting piece (42) and the second connecting piece (43);

each of the lamp holders (2) is further provided with an end cap (6), the end cap (6) is provided with a wire pressing block (61) that is configured to be pressed into the linear groove (22), one end of the lamp holder body (21) is provided with a blind hole (26), the end cap (6) is provided with a plug-in strip (62), and the plug-in strip (62) is coated with glue and is inserted into the blind hole (26), such that the end cap (6) is fixedly connected to the lamp holder body (21); and a sealing member (31) is further disposed between each of the lamp holders (2) and each of the bulb shells (3), and each of the bulb shells (3) is threadedly connected to each of the lamp holders (2) to apply pressure to the sealing member (31) to form sealing.

2. The LED light string according to claim 1, wherein:

the first connecting piece (42) and the second connecting piece (43) are both metal conductive components; and the puncturing portions (44) of the first connecting piece (42) and the second connecting piece (43) are configured to puncture an insulating rubber sheet of the series-connecting wire (1) and electrically contact a conductive wire core inside the series-connecting wire (1).

3. The LED light string according to claim 1, wherein a distance between a top end of the puncturing portion (44) and a bottom of the linear groove (22) is greater than 2 mm.

4. The LED light string according to claim 1, wherein:

the mounting base (41) is provided with a plug-in port (45);

the first connecting piece (42) and the second connecting piece (43) are each provided with a U-shaped snap-fit portion (46) located in the plug-in port (45); and the LED light source (5) is positioned via the plug-in port (45) and is snap-fitted to the U-shaped snap-fit portion (46).

5. The LED light string according to claim 1, wherein:

the mounting base (41) is provided with a plug-in port (45);

the LED light source (5) is provided with an electrical connecting plate (51);

an end of the electrical connecting plate (51) is configured to be inserted into the plug-in port (45); and another end of the electrical connecting plate (51) is provided with an LED light bar (52).

6. The LED light string according to claim 1, wherein:

the mounting base (41) is provided with a plug-in port (45);

a positioning groove (451) is formed in the plug-in port (45);

the LED light source (5) is provided with an electrical connecting plate (51) configured to be inserted into the plug-in port (45); and a protruding electronic component (55) configured to be positioned and plugged into the positioning groove (451) is disposed on the electrical connecting plate (51).

7. The LED light string according to claim 1, wherein:

the first connecting piece (42) and the second connecting piece (43) are each provided with a U-shaped snap-fit portion (46) embedded into the mounting base (41);

a bending portion (47) is disposed between the U-shaped snap-fit portion (46) and the puncturing portion (44); and the bending portion (47) enables the first connecting piece (42) and the second connecting piece (43) to be Z-shaped.

8. The LED light string according to claim 1, wherein:

a portion of each of the lamp holders (2) located in the accommodating cavity (4) is provided with a waterproof groove (48); and the sealing member (31) is snap-fitted and fixed to the waterproof groove (48).

9. The LED light string according to claim 1, wherein:

each of the bulb shells (3) is provided with a neck (32);

a first connecting portion (49) is disposed on an inner wall of the accommodating cavity (4);

a second connecting portion (33) is disposed at a front end of the neck (32); and the first connecting portion (49) threadedly matches the second connecting portion (33).

10. The LED light string according to claim 1, wherein:

each of the bulb shells (3) is provided with a neck (32) connected to each of the lamp holders (2);

the neck (32) is provided with a snap ring (34); and the sealing member (31) is disposed on the snap ring (34).

* * * * *